United States Patent [19]
Peters et al.

[11] Patent Number: 4,794,687
[45] Date of Patent: Jan. 3, 1989

[54] FIXTURE SYSTEM FOR WORKPIECE MACHINING

[75] Inventors: Jerry W. Peters, Mulvane; John L. Burnett, Derby, both of Kans.

[73] Assignee: The Boeing Company, Seattle, Wash.

[21] Appl. No.: 788,039

[22] Filed: Oct. 16, 1985

[51] Int. Cl.[4] ............................................. B23Q 3/06
[52] U.S. Cl. ...................................... 29/559; 29/56.6; 29/563; 269/900; 409/225
[58] Field of Search .................. 269/63, 69, 303, 900; 409/219, 220, 225, 218; 29/563, 564, 56.6, 559

[56] References Cited

U.S. PATENT DOCUMENTS

| | | | |
|---|---|---|---|
| 3,175,820 | 8/1965 | Schiler | 269/900 X |
| 3,229,365 | 1/1966 | Fisher et al. | 29/559 |
| 3,833,312 | 9/1974 | Miles et al. | 29/564 X |
| 3,866,309 | 2/1975 | Rohlfs | 29/564 X |
| 4,058,885 | 11/1977 | Bergman | 29/559 |
| 4,186,916 | 2/1980 | Varga | 269/303 |
| 4,191,366 | 3/1980 | Rabin | 269/900 X |
| 4,286,778 | 9/1981 | Follmeyer | 269/900 X |
| 4,298,195 | 11/1981 | McDougal | 269/900 X |
| 4,480,364 | 11/1984 | Kosmowski | 29/56.6 |
| 4,516,318 | 5/1985 | Kirschenman | 409/218 X |
| 4,585,217 | 4/1986 | Erickson | 269/900 X |

FOREIGN PATENT DOCUMENTS 8050  1/1982  Japan ..................................... 269/69

OTHER PUBLICATIONS

CAD/CAM/CAV Application Digest Boeing Military Airplane Co., vol. III, No. 8, Aug. 1984.

Primary Examiner—Z. R. Bilinsky
Attorney, Agent, or Firm—Finnegan, Henderson, Farabow, Garrett & Dunner

[57] ABSTRACT

A fixture system for numerical controlled rough and finished machining of a workpiece including a first fixture having defined reference points for rough machining and a second fixture having the same defined reference points for finish machining. The system is used in conjunction with CAD/CAM applications under the control of Tool Design and NC Programming.

8 Claims, 6 Drawing Sheets

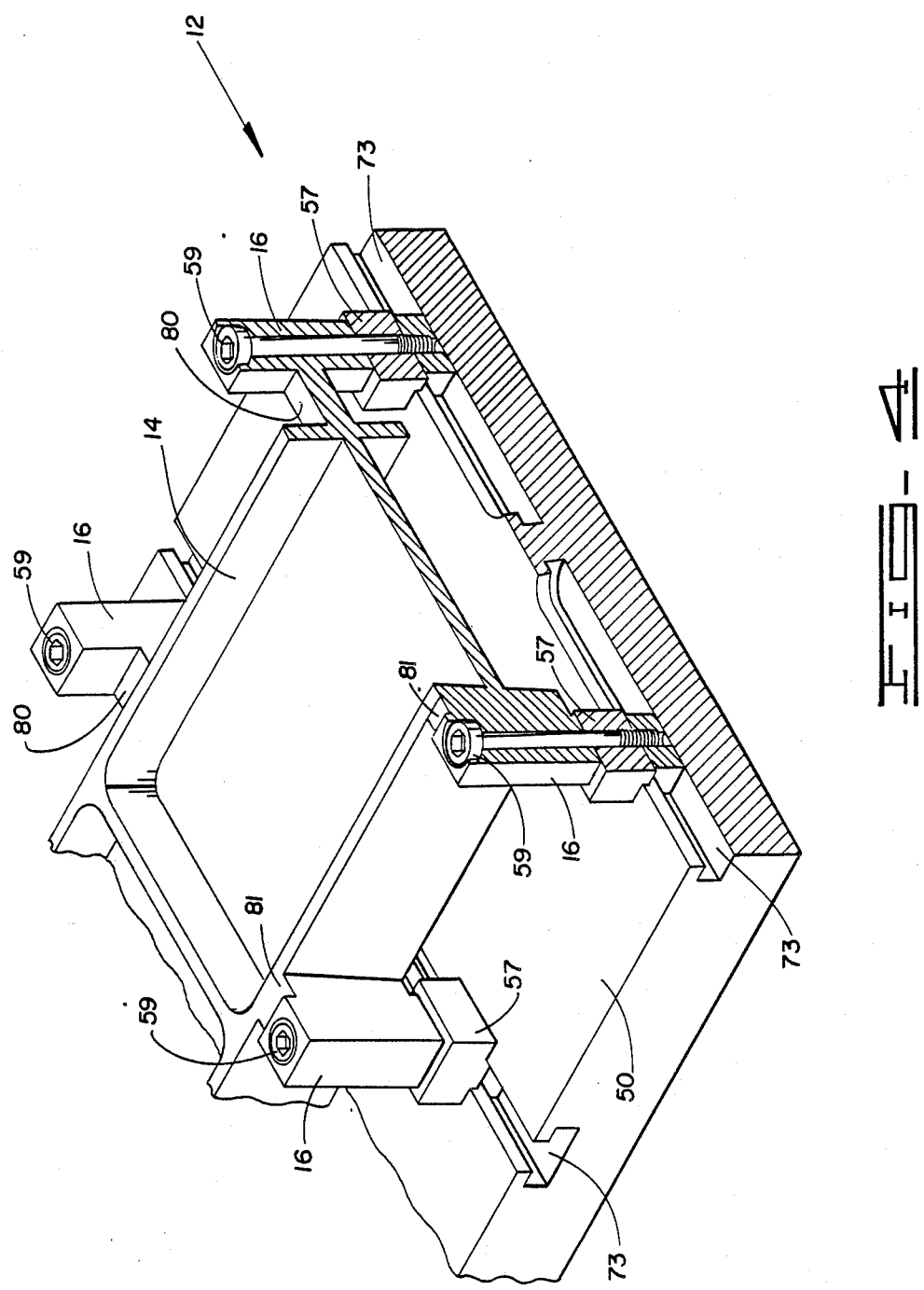

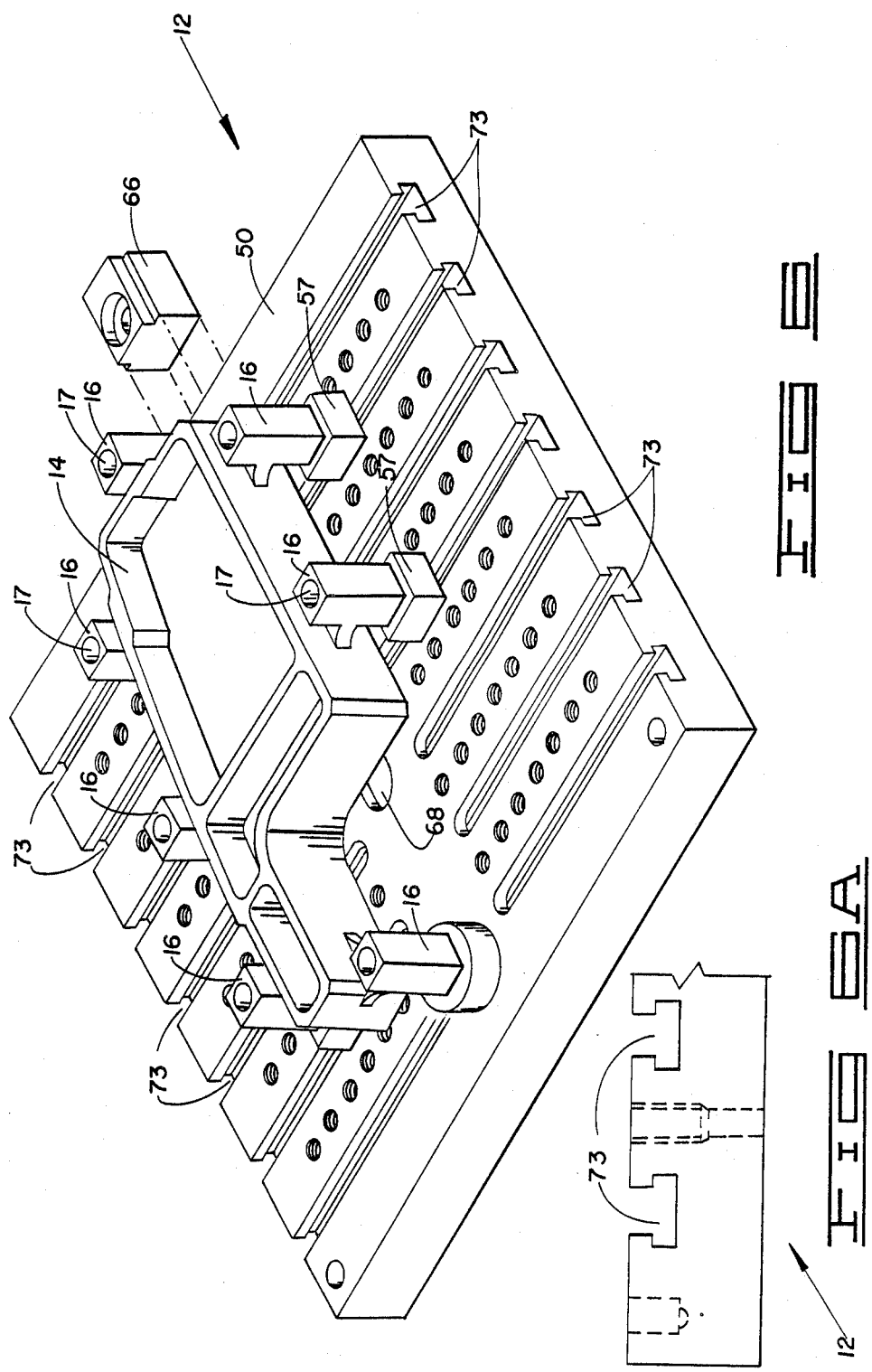

FIXTURE SYSTEM FOR WORKPIECE MACHINING

BACKGROUND OF THE INVENTION

This invention relates to machining of a workpiece using CAD/CAM applications and more particularly, but not by way of limitation, to a fixture system for use during rough and finished machining of a workpiece using a numerical controlled milling machine.

Heretofore, there have been various types of milling tools having a plurality of fixtures for receiving adjustable backup support blocks along with hydraulic clamps used for securing a workpiece. These types of devices are described in the following patents: U.S. Pat. No. 2,061,369 to Prendergast et al; U.S. Pat. No. 2,182,154 to Lancaster; U.S. Pat. No. 4,191,366 to Rabin; and U.S. Pat. No. 4,445,675 to Kitaura. None of these prior art patents particularly point out the unique features and advantages of the subject flexible milling device.

SUMMARY OF THE INVENTION

The subject fixture system greatly reduces set-up and machining time in rough and finish machining of a workpiece. Further, the system helps reduce handling and storage of parts.

The invention is used in conjunction with a numerical controlled milling machine but can be used equally well with different types of machining equipment.

Through the use of a fixed index point and an adjustable index point on a first fixture and a second fixture of the milling device, rough and finished machining can be accomplished for identical workpieces. The device can then be quickly adapted for machining a different part using the same fixed index point and adjusting the adjustable index point on the two fixtures.

The fixture system used with a numerical controlled mill and the like for rough and finish machining of a workpiece includes a first fixture for receiving the workpiece in block form thereon for rough machining. The first fixture establishes a centerline therethrough forming an "X" axis and a "Y" axis at one side of the fixture. The intersection of the "X" and "Y" axes form a fixed index point. The first fixture includes adjustable locator blocks and clamps for securing the workpiece thereon during the rough machining operation. The second fixture receives the rough-machined workpiece thereon. The second fixture has a centerline therethrough forming a "X" axis and a "Y" axis at one side of the fixture. The intersection of the "X" axis and "Y" axes form a fixed index point corresponding with the fixed index point of the first fixture.

The workpiece is secured to the second fixture at the fixed index point. The second fixture further includes an adjustable index point at the intersection of the "X" axis and a "Y$_2$" axis on the opposite side of the fixtures. The workpiece is also secured to the fixtures at the adjustable index point.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 4 is a cross-sectional view of a portion of the workpiece secured to the second fixture through the use of different types of lugs integrally formed along the sides of the workpiece.

FIG. 5 is a partial cross-sectional view of a workpiece on the second fixture illustrating the use of riser blocks to prevent gouging into the second fixture.

FIG. 6A is a cross-sectional view of a part of the second fixture.

DETAILED DESCRIPTION OF THE DRAWINGS

Figure 1:
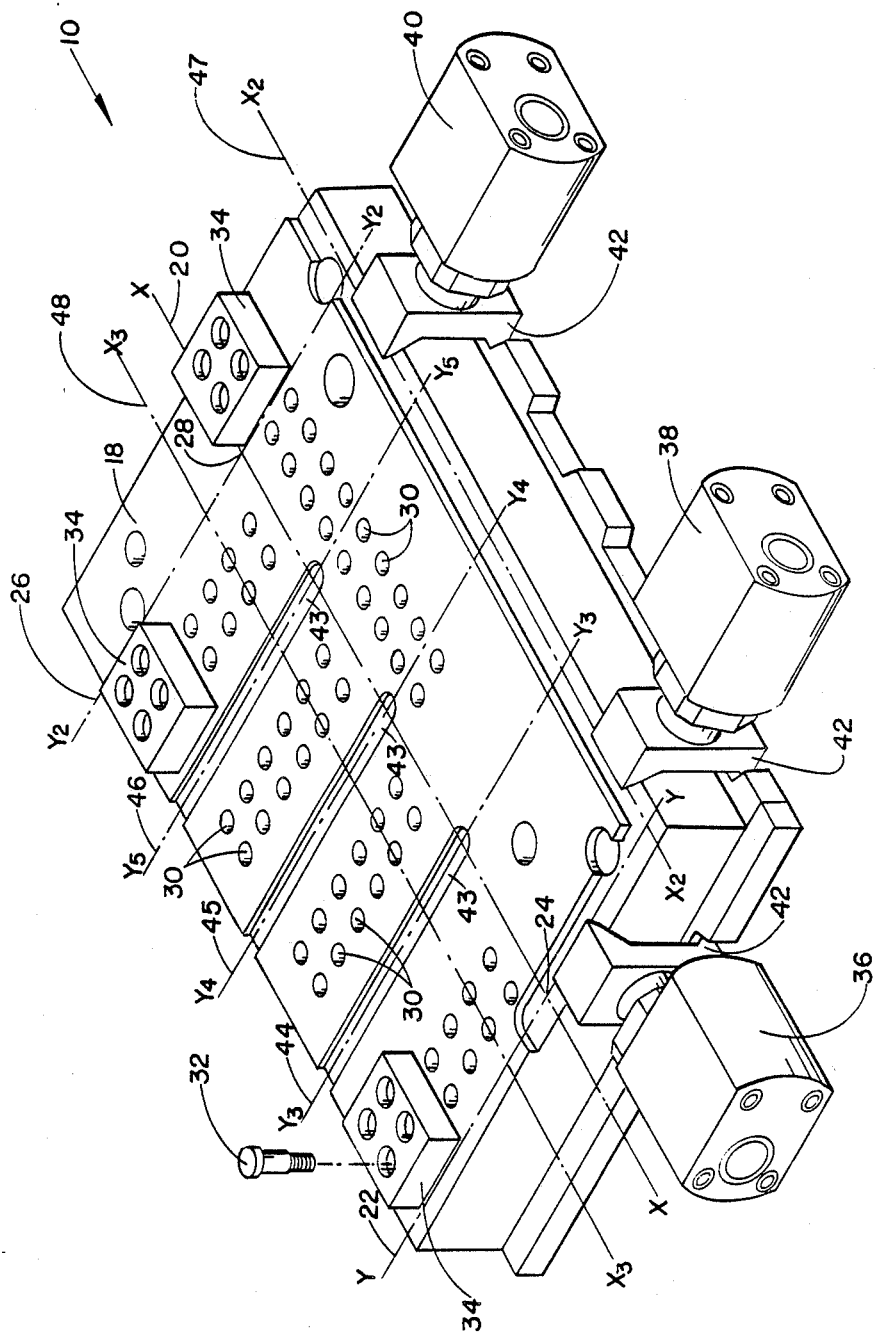
FIG. 1 is a perspective view of the first fixture of the invention.
Figure 3:
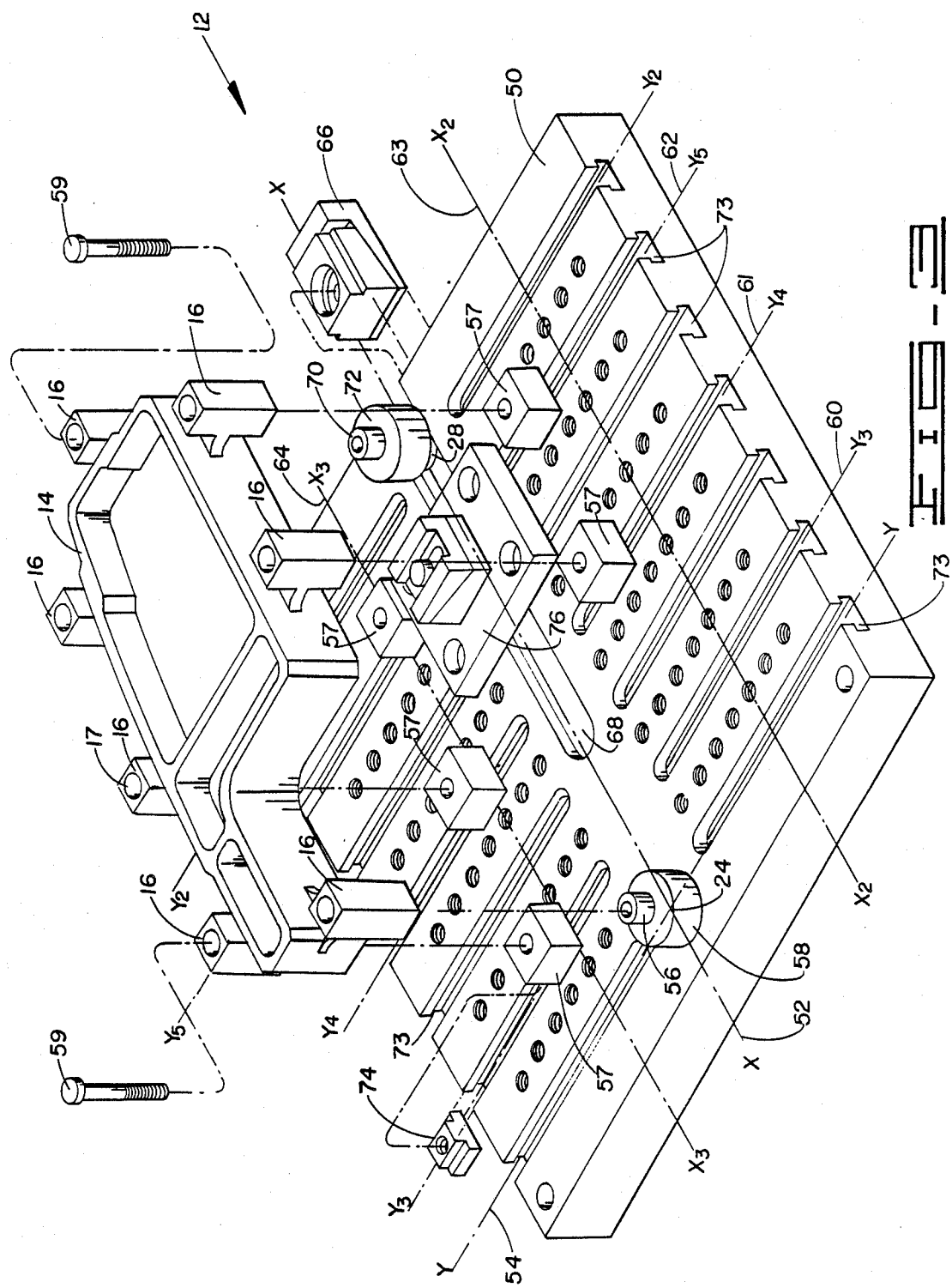
FIG. 3 is a perspective view of the second fixture receiving the rough machine workpiece thereon.

The fixture system for use with a numerical controlled milling machine and the like includes a first fixture depicted in FIG. 1 and designated by general reference numeral 10, and a second fixture designated by general reference numeral 12 and shown in FIG. 3. The numerical controlled milling machine is not shown in the drawings. The milling machine performs work using the universal milling device on a rough block or workpiece 14 which is rough machined on the fixture 10 and then removed and secured on top of the second fixture 12 for finish machining. The workpiece 14 may have various types of configurations depending on the part required and includes a plurality of hold-down lugs 16 which are integrally formed to the outside of the workpiece 14 and later removed as discussed under FIGS. 4 and 7.

Referring back to FIG. 1, the first fixture 10 includes a top surface 18 having a centerline or "X" axis 20 and a "Y" axis 22 on one side of the fixture. The intersection of "X" axis 20 and "Y" axis 22 defines fixed index point 24. This point is used by design graphics in conjunction with CAD/CAM applications for feeding the necessary data to the numerical controlled milling machine for machining the workpiece 14.

Figure 2:
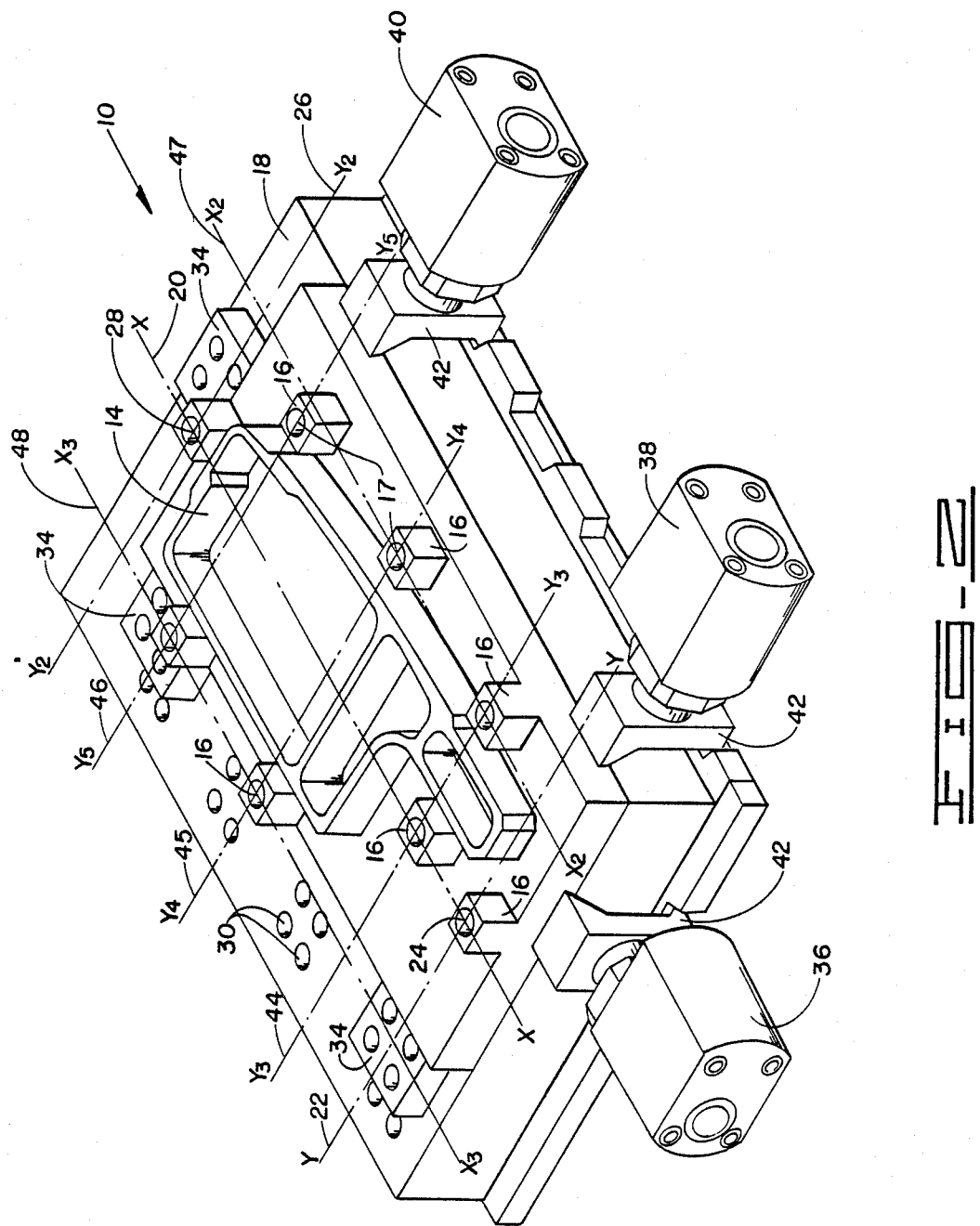
FIG. 2 is a perspective view of a workpiece secured on the first fixture.

Further, a second "Y$_2$" axis 26 is located on the opposite side of the fixture 10 and intersects "X" axis 20 defining an adjustable index point 28. The location of adjustable point 28 will vary depending on the size and length of the workpiece machined. The top surface 18 of the fixture 10 further includes a plurality of apertures 30 therein for receiving bolts 32 for securing adjustable locator blocks 34 which are used for engaging adjacent sides of the workpiece 14 as shown in FIG. 2. The opposite sides of the workpiece 14 are engaged by two fixed hydraulically operated clamps 36 and 38 and a movable hydraulic clamp 40. The hydraulic operated clamps 36, 38 and 40 include clamp heads 42 which are used to engage the lower sides of the workpiece 14 and secure the workpiece against the adjustable locator blocks 34 and to apply a downward force to secure the workpiece against top surface 18 during the rough machining of the workpiece 14 on top of the fixture 10.

In FIG. 2 the workpiece 14 is rough machined, as shown, during which a plurality of hold-down lugs 16 with holes 17 drilled therein are formed. Two of the lugs 16 will correspond and center over the fixed index point 24 and adjustable index point 28 of second fixture 12. It should be noted that in FIG. 1 the first fixture 10 includes a plurality of lateral slots 43 which are parallel to the "Y" axis 22 and define "$Y_3$", "$Y_4$" and "$Y_5$" axes having numerals 44, 45 and 46. These axes also intersect a "$X_2$" axis 47 which is disposed along a lower side of the surface 18. The surface 18 is undercut to prevent a machine drill from gouging into the top surface 18 when providing index holes in the lugs 16. Also, a "$X_3$" axis 48 is provided for additional reference points when intersecting with the "$Y_3$", "$Y_4$" and "$Y_5$" axes and locating hold-down holes 17 in the hold-down lugs 16.

The workpiece 14, as seen in FIG. 2 is formed with a plurality of lugs 16 with index holes 17 corresponding with the fixed index point 24 and adjustable index point 28 and any additional hold-down points as required. These points provide a reference when the rough machined workpiece 14 is removed and secured to top surface 50 of the second fixture 12 as shown in FIG. 3. In FIG. 3 the second fixture 12 is shown with a "X" axis 52 which corresponds with the "X" axis 20 of the first fixture. Likewise, the second fixture 12 includes the "Y" axis 54 which corresponds with the "Y" axis 22 of the first fixture. Also, the intersection of the "X" axis and "Y" axis provides the same fixed index point 24 for receiving a fixed index pin 56 with riser 58. The second fixture 12 also includes a plurality of risers 57 used for engaging the bottom of the lugs 16 and securing the workpiece 14 above the top surface 50 of the fixture 12 using bolts 59.

The second fixture 12 further includes "$Y_3$", "$Y_4$" and "$Y_5$" axes having numerals 60, 61 and 62 which intersect adjustable "$X_2$" axis 63 and adjustable "$X_3$" axis 64 and which correspond to the "Y" axes 44, 45 and 46 and adjustable X axes 47 and 48 on first fixture 10. Using the index points 24 and 28 along with the intersection of the adjustable "X" axes and the "Y" axes, the rough machined workpiece 14 can be quickly attached to the top of the second fixture 12 for finish machining. At the adjustable index point 28 an adjustable index block 66 is used and is received in a lateral slot 68 extending along a portion of the "X" axis 52 and includes an adjustable index pin 70 with riser 72 for securing the workpiece 14 at the adjustable index point 28 on top of the fixture 12.

Figure 6:
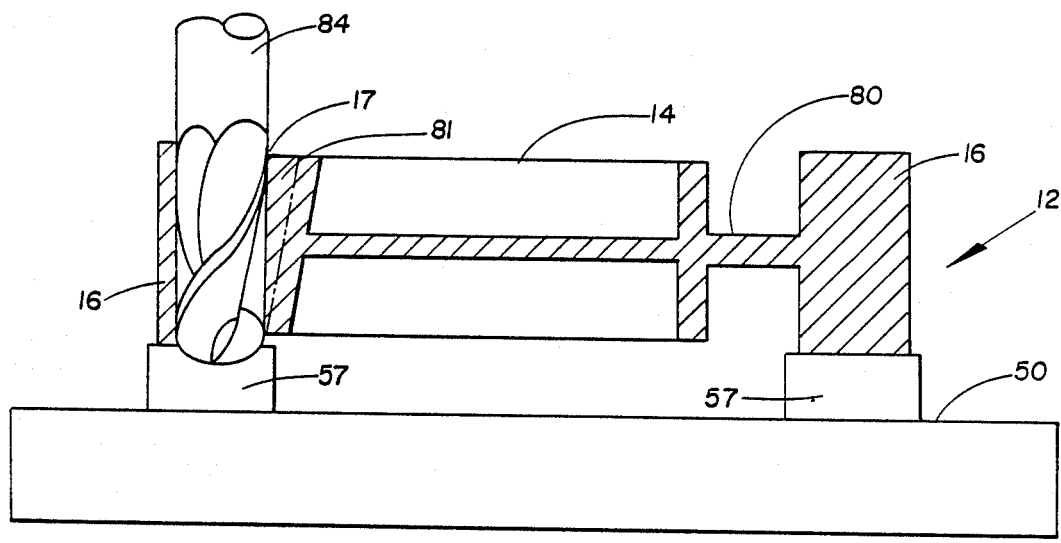
FIG. 6 is a perspective view of the second fixture with the workpiece having been finish machined prior to removing the hold-down lugs.

The second fixture further includes a plurality of lateral "T" slots 73. The "T" slots 73 receive a "T" nuts 74 for securing the risers 57 and workpiece 14 on top of the fixture 12. The risers 57 and index blocks 58 and 72 act to hold the workpiece 14 above the surface 50 to prevent a machine tool from contacting and gouging the surface of the fixture 12. Note, on some workpieces, risers 57 are not needed. A perspective view of the "T" slots 73, risers 57 and workpiece 14 can be seen in FIG. 6 and a cross-sectional view of a portion of fixture 12 is depicted in FIG. 6A. The workpiece 14 is shown secured to the top of the fixture 12 in this Fig. Also shown in FIGS. 3 and 6 is an adjustable index block 66 for engaging the adjustable index pin 70 with riser 72. Shown in FIG. 3 is an adjustable support 76 which can be used for engaging large pockets machined into the workpiece 14 to prevent or dampen vibration of the workpiece 14 during the machining thereof.

In FIG. 4, a sectional view of a portion of the second fixture 12 is shown with workpiece 14. In this view, the lugs 16 are shown more clearly with the lugs 16 on the right side of the workpiece 14 machined so they are secured to the workpiece by an outwardly extending narrow arm 80. The left hand lugs 16 are secured to the sides of the workpiece by arms 81 which have substantially the same thickness of the original unmachined workpiece 14.

Figure 7:
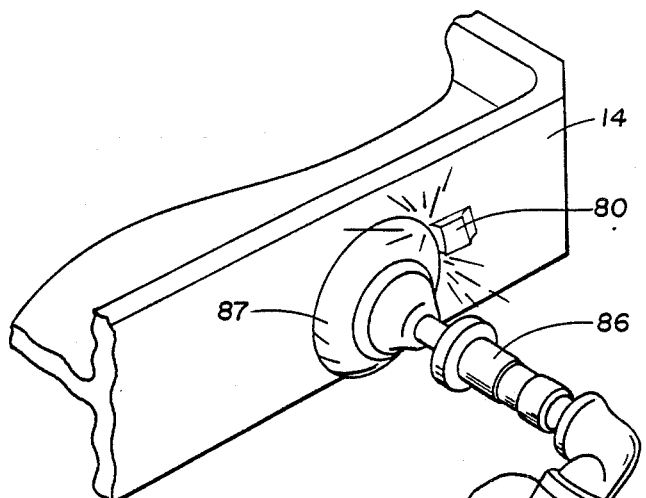
FIG. 7 illustrates the blending of the workpiece after the hold-down lugs have been conventionally milled off.

In FIG. 5, a side-sectional view of the workpiece 14 is shown with a ball-nosed cutter 84 in the position of cutting the side of the part. As can be appreciated, the risers 57 are used so the cutter 84 is prevented from gouging into the top surface 50 of the fixture 12 during the finishing of the workpiece 14. When the workpiece 14 is completed, the arms 80 and 81 of the index lugs 16 are machined off and hand ground finished using a hand-held grinder 86 with grinding stone 87 as shown in FIG. 7. All other hold-down lugs are machined off and surface blended on the N/C milling maching.

Changes may be made in the construction and arrangement of the parts or elements of the embodiments as described herein without departing from the spirit or scope of the invention defined in the following claims.

What is claimed is:

1. A method of holding a workpiece for numerically controlled rough and finish machining thereof, said method comprising the steps of:

defining on the workpiece first and second spaced, predetermined reference points;

fixing said workpiece on a first fixture with said first and second reference points in registration, respectively, with a fixed index point and an index axis numerically defined on the surface of said first fixture;

boring hold-down holes in said workpiece at said first and second reference points;

after rough machining, removing said workpiece from said first fixture and placing said workpiece on a second fixture with the hold-down bores at said first and second reference points in registration with threaded bores in the surface of said second fixture; and placing attachment means through said hold-down bores for threadable engagement of said threaded bores to fix said workpiece to said second fixture for finish machining.

2. A fixture system for holding a workpiece during numerically controlled rough and finish machining of said workpiece, said system comprising:

a first fixture including a generally planar surface having a fixed index point and an index axis numerically defined thereon, means for adjustably engaging the periphery of a workpiece to fix said workpiece to said surface for rough machining thereof, said engaging means fixedly registering first and second predetermined reference points on said workpiece with said fixed index point and index axis, respectively, and recess means in said surface for permitting drilling of hold-down bores in said workpiece at said first and second reference points without damaging said surface; and a second fixture including a generally planar surface and hold-down means disposed in said surface for registration with said hold-down bores and for fixedly receiving means removeably disposed through said hold-down bores for attaching said rough machined workpiece to said second fixture for finish machining.

3. A fixture system for holding a workpiece during numerically controlled rough and finish machining of said workpiece, said system comprising:

a first fixture including a generally planar surface having numerically defined thereon a predetermined fixed index point and an index axis having a fixed, predetermined relation to said fixed index point;

means for fixing said workpiece to said surface for rough machining thereof, said fixing means engaging the periphery of said workpiece and including means for fixedly registering first and second predetermined reference points on said workpiece with said fixed index point and said index axis, respectively; and recess means disposed in said surface for permitting drilling of hold-down bores in said workpiece at said first and second predetermined reference points and at other predetermined reference points in said workpiece without damaging said surface; and a second fixture including a generally planar surface;

a fixed hold-down means disposed in said surface for registration with the hold-down bore at said first reference point;

a variable hold-down means in said surface for registration with the hold-down bore at said second reference point, said variable hold-down means being selectively moveable along a line having a fixed, predetermined relation with said fixed hold-down means corresponding to the relation between said fixed index point and said index axis; and a plurality of other hold-down means in said surface for registration with the hold-down bores at said other reference points, each said hold-down means being disposed to fixedly receive attachment means removeably disposed in said hold-down bores for fixing said workpiece to said second fixture for finish machining.

4. The fixture system of claim 3 wherein said recess means comprise a plurality of holes and grooves disposed in said surface in fixed predetermined locations.

5. The fixture system of claim 3 wherein said fixed hold-down means comprises a threaded bore in the surface of said second fixture.

6. The fixture system of claim 3 wherein said variable hold-down means comprises an elongated slot having an inverted T-shaped cross-section disposed in said surface along said line and an index block having a threaded bore, said block being slidably movable in said slot for locating said threaded bore in registration with the hold-down bore at said second reference point.

7. The fixture system of claim 3 wherein said other hold-down means comprise a plurality of threaded bores disposed in a predetermined array in the surface of said second fixture for registration with hold-down bores at other reference points and a plurality of elongated slots each having an inverted T-shaped cross-section disposed in a predetermined relationship in the surface of said second fixture and a plurality of index blocks each having a threaded bore and being slidably movable in said slots for selective registration with hold-down bores at other reference points.

8. The fixture system of claim 3 also including means selectively disposable in operative relation with said fixed, variable and other hold-down means for supporting said workpiece in spaced relation with the surface of said second fixture.

* * * * *